(12) United States Patent
Behrend et al.

(10) Patent No.: US 10,372,413 B2
(45) Date of Patent: Aug. 6, 2019

(54) FIRST-IN-FIRST-OUT BUFFER

(71) Applicant: International Business Machines Corporation, Armonk, NY (US)

(72) Inventors: Joerg Behrend, Rangendingen (DE); Markus Cebulla, Gerstetten (DE); Rolf Fritz, Waldenbuch (DE); Andreas Koenig, Boeblingen (DE); Daniel D. Sentler, Steinenbronn (DE)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 15/268,627

(22) Filed: Sep. 18, 2016

(65) Prior Publication Data

US 2018/0081623 A1 Mar. 22, 2018

(51) Int. Cl.
*G06F 5/14* (2006.01)
*G06F 13/42* (2006.01)
*G06F 13/16* (2006.01)
*G06F 5/06* (2006.01)

(52) U.S. Cl.
CPC ............ *G06F 5/14* (2013.01); *G06F 5/06* (2013.01); *G06F 5/065* (2013.01); *G06F 13/1673* (2013.01); *G06F 13/4282* (2013.01); *G06F 2205/067* (2013.01); *G06F 2205/126* (2013.01)

(58) Field of Classification Search
CPC ... G06F 5/065; G06F 13/1673; G06F 13/4282
USPC .......................................................... 710/57
See application file for complete search history.

(56) References Cited

U.S. PATENT DOCUMENTS

| 4,090,256 A | * | 5/1978 | Hepworth | G11C 19/287 |
| | | | | 365/154 |
| 4,225,919 A | * | 9/1980 | Kyu | G06F 13/32 |
| | | | | 370/463 |
| 4,270,183 A | | 5/1981 | Robinson | |
| 4,292,465 A | * | 9/1981 | Wilson | H04L 12/50 |
| | | | | 178/3 |
| 4,523,299 A | * | 6/1985 | Donohue | G03G 15/50 |
| | | | | 370/431 |
| 4,833,655 A | | 5/1989 | Wolf | |
| 5,423,048 A | * | 6/1995 | Jager | G06F 9/3804 |
| | | | | 711/137 |

(Continued)

FOREIGN PATENT DOCUMENTS

EP 2996035 A1 3/2016

OTHER PUBLICATIONS

Kim et al.; "Design of Asynchronous RISC CPU Register-File Write-Back Queue"; 2015 IFIP/IEEE International Conference on Very Large Scale Integration (VLSI-SoC) , Oct. 5-7, 2015.

(Continued)

*Primary Examiner* — Paul R. Myers
(74) *Attorney, Agent, or Firm* — Andrew Aubert

(57) ABSTRACT

Disclosed aspects relate to a first-in-first-out (FIFO) buffer. The FIFO buffer may include an input interface to receive a set of data payloads. The FIFO buffer may include a set of buffer entry elements to store the set of data payloads. The FIFO buffer may include a set of status indicators to indicate a set of statuses of the set of buffer entry elements with respect to the set of data payloads. The FIFO buffer may include an output interface for release of the set of data payloads.

15 Claims, 5 Drawing Sheets

(56) References Cited

U.S. PATENT DOCUMENTS

| | | | | |
|---|---|---|---|---|
| 5,519,701 | A * | 5/1996 | Colmant | H04L 29/06 370/412 |
| 5,594,702 | A * | 1/1997 | Wakeman | G06F 5/065 345/501 |
| 5,787,483 | A * | 7/1998 | Jam | H04L 12/2801 711/109 |
| 5,841,988 | A | 11/1998 | Chennubhotla et al. | |
| 5,845,085 | A * | 12/1998 | Gulick | H04L 29/06 709/236 |
| 5,923,895 | A * | 7/1999 | Nookala | G06F 5/06 365/219 |
| 5,974,516 | A * | 10/1999 | Qureshi | G06F 5/065 710/52 |
| 6,366,529 | B1 * | 4/2002 | Williams | G06F 5/06 365/189.02 |
| 6,378,035 | B1 * | 4/2002 | Parry | G11B 20/10 375/E7.025 |
| 6,539,023 | B1 * | 3/2003 | Bartholomay | H04L 49/90 370/412 |
| 6,597,660 | B1 * | 7/2003 | Rueda | H04L 43/0894 370/230.1 |
| 6,880,050 | B1 * | 4/2005 | Korger | G06F 5/12 710/55 |
| 7,254,677 | B1 | 8/2007 | Lowe et al. | |
| 8,117,420 | B2 * | 2/2012 | Shen | G06F 12/1027 711/100 |
| 8,156,284 | B2 | 4/2012 | Vorbach et al. | |
| 8,194,755 | B2 | 6/2012 | Lin et al. | |
| 8,225,329 | B1 | 7/2012 | Lynn | |
| 8,239,580 | B2 | 8/2012 | Hausman et al. | |
| 2007/0223265 | A1 | 9/2007 | Radulescu | |
| 2008/0084947 | A1 | 4/2008 | Shih | |
| 2016/0035399 | A1 * | 2/2016 | Yaraduyathinahalli | G11C 7/10 365/189.17 |

OTHER PUBLICATIONS

Behrend et al., "First-In-First-Out Buffer", U.S. Appl. No. 15/888,148, filed Feb. 5, 2018.

List of IBM Patents or Patent Applications Treated as Related, Filed Feb. 5, 2018, 2 pages.

* cited by examiner

FIRST-IN-FIRST-OUT BUFFER

BACKGROUND

This disclosure relates generally to computer systems and, more particularly, relates to a first-in-first-out buffer. Computer systems may make use of first-in-first-out buffer systems to facilitate communication between components. The amount of information to be communicated between components of computer systems is increasing. As the amount of information to be communicated increases, the need for management of first-in-first-out buffer systems may also increase.

SUMMARY

Aspects of the disclosure relate to a first-in-first-out (FIFO) buffer. The FIFO buffer may be used to facilitate data communication between a sending unit and a receiving unit. The FIFO buffer may include a set of buffer entry elements to store packets for transfer. A status register of the FIFO buffer may maintain a set of statuses for the set of buffer entry elements. The status register may indicate whether the packets stored in the buffer entry elements are valid, invalid, or represent the end of a transmission sequence. As packets are released from the FIFO buffer and new packets enter, the status register may shift register values and refresh to indicate updated status information for the packets held in the FIFO buffer. The status register may be accessible to the receiving unit to provide advance indication of the contents and validity status of incoming packets. Leveraging a status register for buffer entry elements of a FIFO buffer may facilitate data communication between computer components.

Aspects of the disclosure relate to a first-in-first-out (FIFO) buffer. The FIFO buffer may include an input interface to receive a set of data payloads. The FIFO buffer may include a set of buffer entry elements to store the set of data payloads. The FIFO buffer may include a set of status indicators to indicate a set of statuses of the set of buffer entry elements with respect to the set of data payloads. The FIFO buffer may include an output interface for release of the set of data payloads. In embodiments, an input interface may be used to receive a set of data payloads. The set of data payloads may be stored using a set of buffer entry elements. A set of status indicators may establish a set of statuses of the set of buffer entry elements with respect to the set of data payloads. In various embodiments, the set of data payloads may be released using an output interface. In various embodiments, the set of statuses of the set of buffer entry elements may be modified using the set of status indicators.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
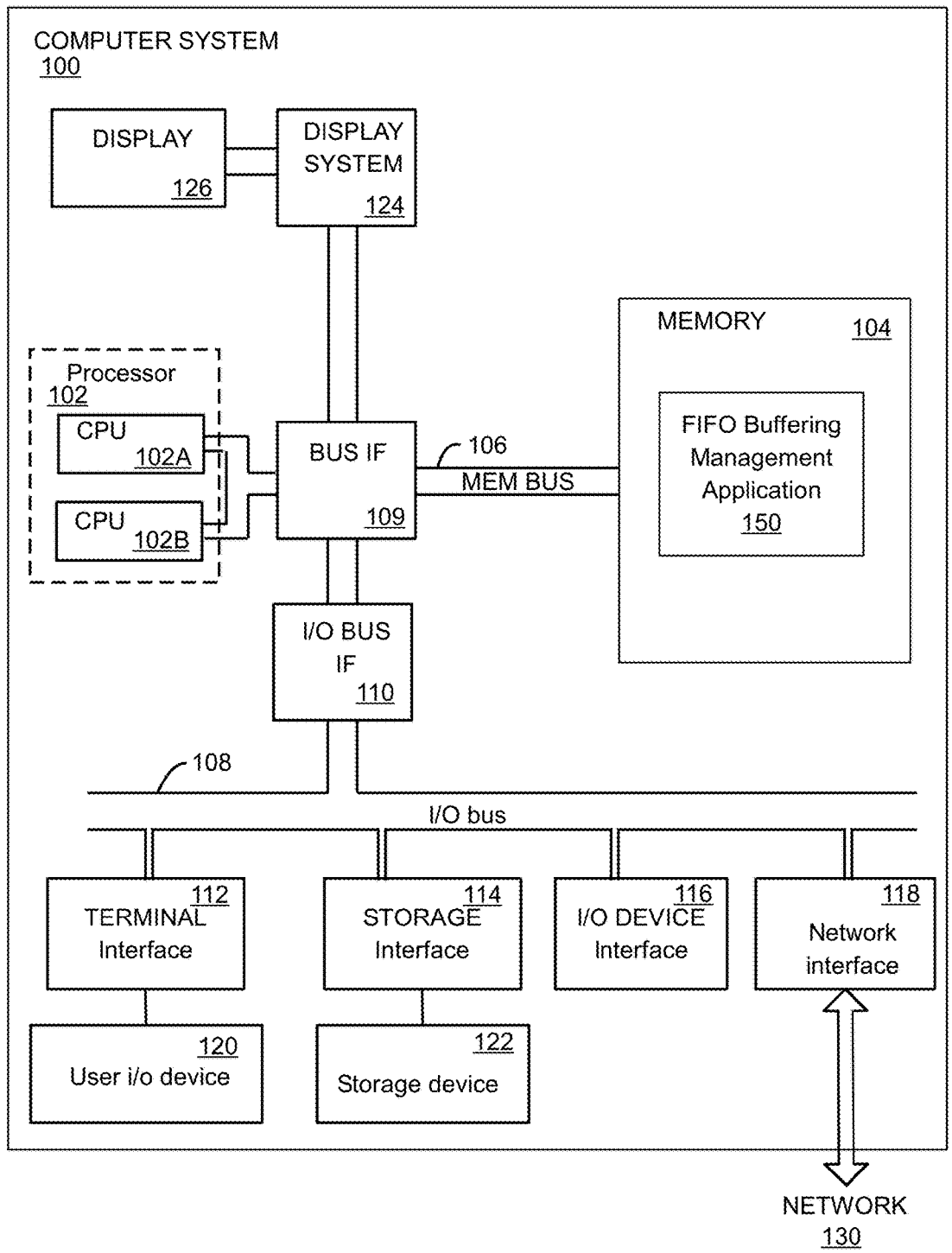
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to a first-in-first-out (FIFO) buffer. The FIFO buffer may be used to facilitate data communication between a sending unit and a receiving unit. The FIFO buffer may include a set of buffer entry elements to store packets (e.g., data payloads) for transfer. A status register (e.g., set of status indicators) of the FIFO buffer may maintain a set of statuses for the set of buffer entry elements. The status register may indicate whether the packets stored in the buffer entry elements are valid, invalid, or represent the end of a transmission sequence. As packets are released from the FIFO buffer and new packets enter, the status register may shift register values and refresh to indicate updated status information for the packets held in the FIFO buffer. The status register may be accessible to the receiving unit to provide advance indication of the contents and validity status of incoming packets. Leveraging a status register for buffer entry elements of a FIFO buffer may facilitate data communication between computer components.

First-in-first-out (FIFO) systems are one tool used for buffering and data flow control between hardware and software components of computer systems. Data elements (e.g., packets, data payloads) may be stored in a hold queue, and the oldest (first) data element may be processed first, such that the data elements may exit the FIFO buffer system in the order in which they were received. Aspects of the disclosure relate to the recognition that, in certain situations, asynchronous communication between computer components may encounter frequency mismatching because FIFO updates may be slow compared to the operation cycle of the connected processor. In such situations, the FIFO updates may trigger invocation of an interrupt handler, resulting in reduced system performance. Accordingly, aspects of the disclosure relate to providing a status register of the FIFO buffer system to indicate the validity status (e.g., valid, invalid, End of Transfer) of the data payloads held in the FIFO buffer system. The status register may be accessible to a receiver of the set of data payloads to provide advance indication of the contents of the FIFO buffer system. As such, the need for interrupts may be reduced, and efficient data communication between computer components may be facilitated.

Aspects of the disclosure include a system, method, and computer program product for a first-in-first-out (FIFO) buffer (e.g., FIFO buffer system or the like). In embodiments, the FIFO buffer may include an input interface to receive a set of data payloads. The FIFO buffer may include a set of buffer entry elements to store the set of data payloads. The FIFO buffer may include a set of status indicators to indicate a set of statuses of the set of buffer entry elements with respect to the set of data payloads. The set of buffer entry elements may be coupled with the set of status indicators. In embodiments, the FIFO buffer may include an output interface for release of the set of data payloads.

In embodiments, the set of status indicators may include a set of status fields which indicate the set of statuses of the set of buffer entry elements with respect to the set of data payloads. In embodiments, the set of status indicators may include a status register which indicates the set of statuses of the set of buffer entry elements with respect to the set of data payloads. In embodiments, the set of status indicators may include a set of status fields and a status register to indicate the set of statuses of the set of buffer entry elements with respect to the set of data payloads. In embodiments, the set of statuses may include a valid payload status. In embodiments, the set of statuses may include an invalid payload status. In embodiments, the set of statuses may include a boundary status. The boundary status may indicate a limit of a data transfer.

In embodiments, each of the set of buffer entry elements may have a single size value for a valid payload. In embodiments, each of the set of data payloads may have a single size value for a valid payload. In embodiments, the set of status indicators may indicate a sequence of the set of data payloads. In embodiments, the set of status indicators may indicate a sequence of the set of data payloads. In embodiments, the set of status indicators may indicate a size of the set of data payloads. In embodiments, the set of status indicators may indicate a separation between a first subset of the set of data payloads and a second subset of the set of data payloads.

Aspects of the disclosure relate to a first-in-first out (FIFO) buffering methodology. In embodiments, an input interface may be used to receive a set of data payloads. The set of data payloads may be stored using a set of buffer entry elements. A set of status indicators may establish a set of statuses of the set of buffer entry elements with respect to the set of data payloads. In embodiments, the set of data payloads may be released using an output interface. In embodiments, the set of statuses of the set of buffer entry elements may be modified using the set of status indicators. In embodiments, in response to a release of a single data payload, a set of register values of the status register of the set of status indicators may be shifted by a single position. In embodiments, a plurality of data payloads of the set of data payloads may be communicated without an interrupt. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a first-in-first out (FIFO) buffering management application 150. In embodiments, the FIFO buffering management application 150 may include instructions or statements that execute on the processor 102 or instructions or statements that are interpreted by instructions or statements that execute on the processor 102 to carry out the functions as further described below. In certain embodiments, the FIFO buffering management application 150 is implemented in hardware via semiconductor devices, chips, logical gates, circuits, circuit cards, and/or other physical hardware devices in lieu of, or in addition to, a processor-based system. In embodiments, the FIFO buffering management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit.

In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1B illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
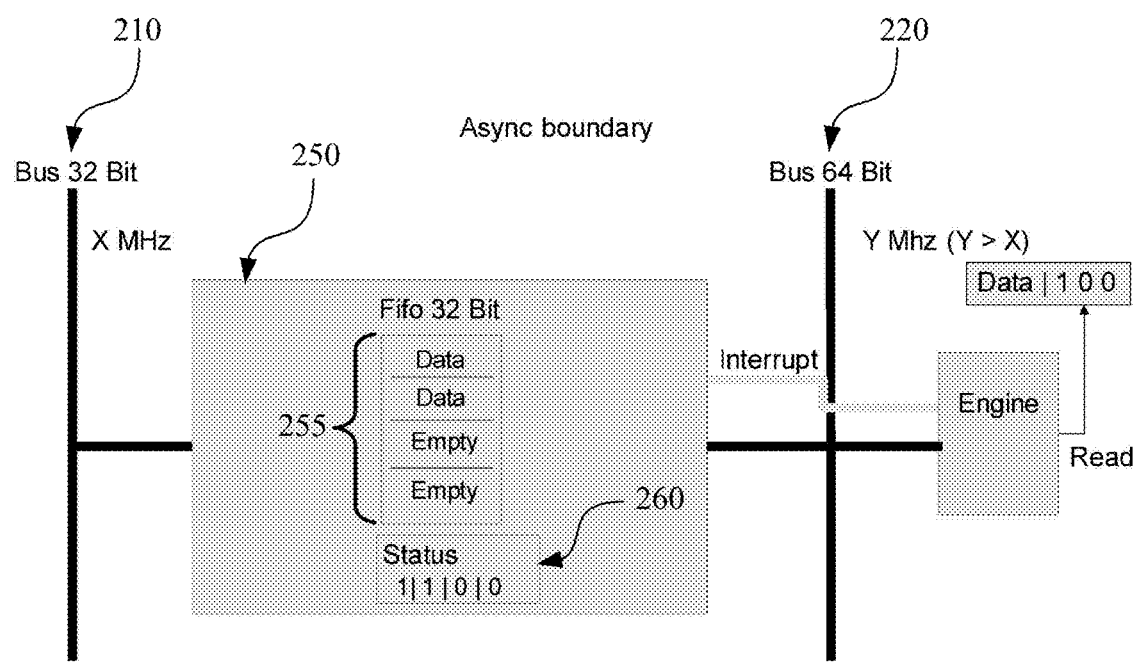
FIG. 2 depicts an example system architecture for implementing aspects of the first-in-first-out buffer system, according to embodiments.

FIG. 2 depicts an example system architecture 200 for implementing aspects of the first-in-first-out (FIFO) buffer system. Aspects of FIG. 2 relate to using a FIFO buffer system in a direct memory access (DMA) environment to facilitate asynchronous data communication between a sending unit and a receiving unit. As shown in FIG. 2, system architecture 200 may include a first bus 210, a second bus 220, a FIFO buffer system 250, a set of buffer entry elements 255, and a set of status indicators 260. Leveraging a set of status indicators 260 for buffer entry elements 255 of a FIFO buffer system 250 may facilitate data communication between computer components.

In embodiments, the system architecture 200 may include a first bus 210 and a second bus 220. The first and second buses 210, 220 may include internal memory bus units configured to facilitate data transfer and asynchronous communication between components of the system architecture 200. Aspects of the disclosure relate to a configuration for inter-bus data transfer in which the first and second buses 210, 220 communicate via the FIFO buffer system 250. In embodiments, the first bus 210 may act as a sender, transmitting packets of data to be relayed by the FIFO buffer system 250 to a destination. In embodiments, the second bus 220 may act as a receiver, configured to accept (e.g., collect, retrieve) the data packets relayed by the FIFO buffer system 250 from the first bus 210. The first and second buses 210, 220 may have a bus width and a clock speed (e.g., unequal clock speeds). For example, the first bus 210 may have a bus size of 32 bits and a clock speed of 2.8 megahertz, and the second bus 220 may have a bus size of 64 bits and a clock speed of 3.4 megahertz. Aspects of the disclosure relate to the recognition that, in certain situations, transfer of data packets from a memory bus having a lower clock speed to a memory bus having a higher clock speed (or vice versa) may be associated with a frequency mismatch (e.g., FIFO updates from the sending unit are different—such as slow—with respect to the processor operation cycle of the receiving unit). Accordingly, aspects of the disclosure relate to using a FIFO buffer system 250 to facilitate asynchronous communication between memory buses having different clock domains using a set of status indicators for the FIFO buffer system 250.

In embodiments, the FIFO buffer system 250 may be configured to facilitate asynchronous data transfer between the first bus 210 and the second bus 220. Generally, the FIFO buffer system 250 may include a data structure configured to hold data elements (e.g., packets) in a queue, maintaining the data elements in the order they were received. The FIFO buffer system 250 may provide access to the maintained data elements using a first-in, first-out access policy (e.g., output data elements in the same order in which they were stored). For instance, the FIFO buffer system 250 may be configured to receive data elements from the first bus 210, maintain them in a hold queue, and relay them to the second bus 220 in the same order in which they were received. In embodiments, the FIFO buffer system 250 may have a buffer size (e.g., FIFO depth). The buffer size may indicate the amount of data that needs to be buffered by the FIFO buffer system 250 to facilitate smooth communication (e.g., no overflows or underflows) between the first bus 210 and the second bus 220. As an example, the buffer size may be 32 bits.

In embodiments, the FIFO buffer system 250 may include a set of buffer entry elements 255. Generally, the set of buffer entry elements 255 may include one or more storage slots, spaces, or areas configured for reception and storage of data elements (e.g., packets from the first bus 210). In embodiments, each buffer entry element of the set of buffer entry elements 255 may represent one queue position for maintaining a data element. The set of buffer entry elements 255 may include a fixed number of queue positions, such that data packets enter the FIFO buffer system 250, are maintained in the set of buffer entry elements 255 (e.g., rotating positions as new data elements enter), and exit the FIFO buffer system 250 in the same order in which they were received. For instance, as shown in FIG. 2, the set of buffer entry elements 255 may include two data elements and two empty elements. Other methods of configuring the FIFO buffer system 250 are also possible.

In embodiments, aspects of the disclosure relate to a FIFO buffer system 250 that has a set of status indicators 260. The set of status indicators 260 may include a data structure configured to indicate (e.g., display) the current status (e.g., state, condition) of the data elements maintained in the set of buffer entry elements 255 of the FIFO buffer system 250. In embodiments, the set of status indicators 260 may indicate the validity status (e.g., valid, invalid, end of transmission) of each data element stored in the set of buffer entry elements 255. As an example, the set of status indicators may utilize binary values to represent the state of each data element (e.g., 1 represents a valid state, 0 represents an invalid condition/end of transmission). As shown in FIG. 2, the set of status indicators 260 may represent that the data elements stored in the first and second buffer entry elements of the set of buffer entry elements 255 are valid, while the third and fourth buffer entry elements are invalid. In embodiments, the set of status indicators may be accessible by the second bus 220, such that the second bus 220 may obtain a preview (e.g., advance indication) of the number, size (e.g., length), separation, and validity status of incoming data elements from the FIFO buffer system 250. Other methods of configuring the set of status indicators 260 are also possible.

Figure 3:
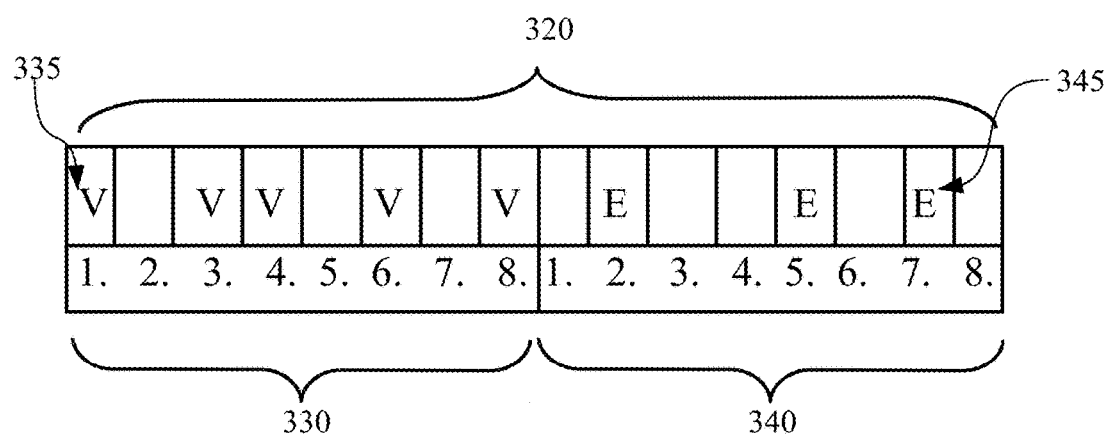
FIG. 3 depicts an example set of status indicators, according to embodiments.

FIG. 3 depicts an example set of status indicators 300, according to embodiments. Aspects of FIG. 3 relate to using the set of status indicators 300 within a FIFO buffer system to provide preview information to one or more components of a computer system (e.g., memory bus) regarding the validity status of data elements maintained in the FIFO buffer system. As shown in FIG. 3, the set of status indicators 300 may include a status register 320, a valid data register 330, a valid data flag 335, an End of Transmission register 340, and an End of Transmission flag 345. The set of status indicators 300 may be associated with benefits including data transfer speed, memory bus performance and efficiency.

In embodiments, as described herein, the set of status indicators 300 may include a data structure configured to indicate the current status (e.g., state, condition) of the data elements maintained in the set of buffer entry elements of a FIFO buffer system. In embodiments, the set of status indicators 300 may include a status register 320. The status register 320 may include a log, index, database, or set of records for storing a representation of the status of one or more data elements of the FIFO buffer system. For instance, the status register 320 may maintain a set of entries corresponding to the set of data elements of the FIFO buffer system (e.g., one bit per buffer entry element of the FIFO buffer system), and mark one or more entries of the set of entries with an indicator of the validity status of the corresponding FIFO data element. In certain embodiments, the status register 320 may include a valid data register 330 and an End of Transmission register 340. The valid data register 330 may be configured to use valid data flags (e.g., valid data flag 335) to record the status of valid data elements, and the End of Transmission register 340 may be configured to use End of Transmission Flags (e.g., End of Transmission flag 340) to record the status of invalid or End of Transmission data elements.

In embodiments, as described herein, the status register 320 may indicate a representation of the validity status of the data elements present in the set of buffer entry elements of the FIFO buffer system. The validity status may include one or more of a valid state, an invalid state, or an End of Transmission. Generally, the valid state may apply to those data elements that are ready for transmission, interpretable (e.g., formatted to be readable by the processing units of the host computer system; non-encrypted), and available for reception by a receiving unit. The invalid state may apply to data elements that are non-interpretable (e.g., formatted in a language or encryption format unreadable by processing units of the host computer system), corrupted, or not available for reception by the receiving unit. In embodiments, the End of Transmission may include a separation, pause, or break in the transmission of data elements from the FIFO buffer system (e.g., between data packets). Other types of validity status are also possible.

In embodiments, the status register 320 may be configured to query the FIFO buffer system to evaluate the data elements, and ascertain the validity status of the data elements maintained in the set of buffer entry elements. In response to ascertaining the validity status, the status register 320 may be configured to update the set of status indicators of the valid data register 330 and the End of Transmission register 340. Consider the following example. The FIFO buffer system may include eight data elements. The status register 320 may run a data element diagnostic tool to analyze each data element of the FIFO buffer system, and detect that the data elements in the first, third, fourth, sixth, and eighth queue positions are valid, and that the data elements in the second and seventh positions represent an End of Transmission signal. Accordingly, as shown in FIG. 2, the status register 320 may mark the first, third, fourth, sixth, and eighth entries of the valid data register 330 with valid data flags, and mark the second and seventh entries of the End of Transmission register with End of Transmission flags. Other methods of recording the validity status of the data elements of the FIFO buffer system in the status register 320 are also possible.

Figure 4:
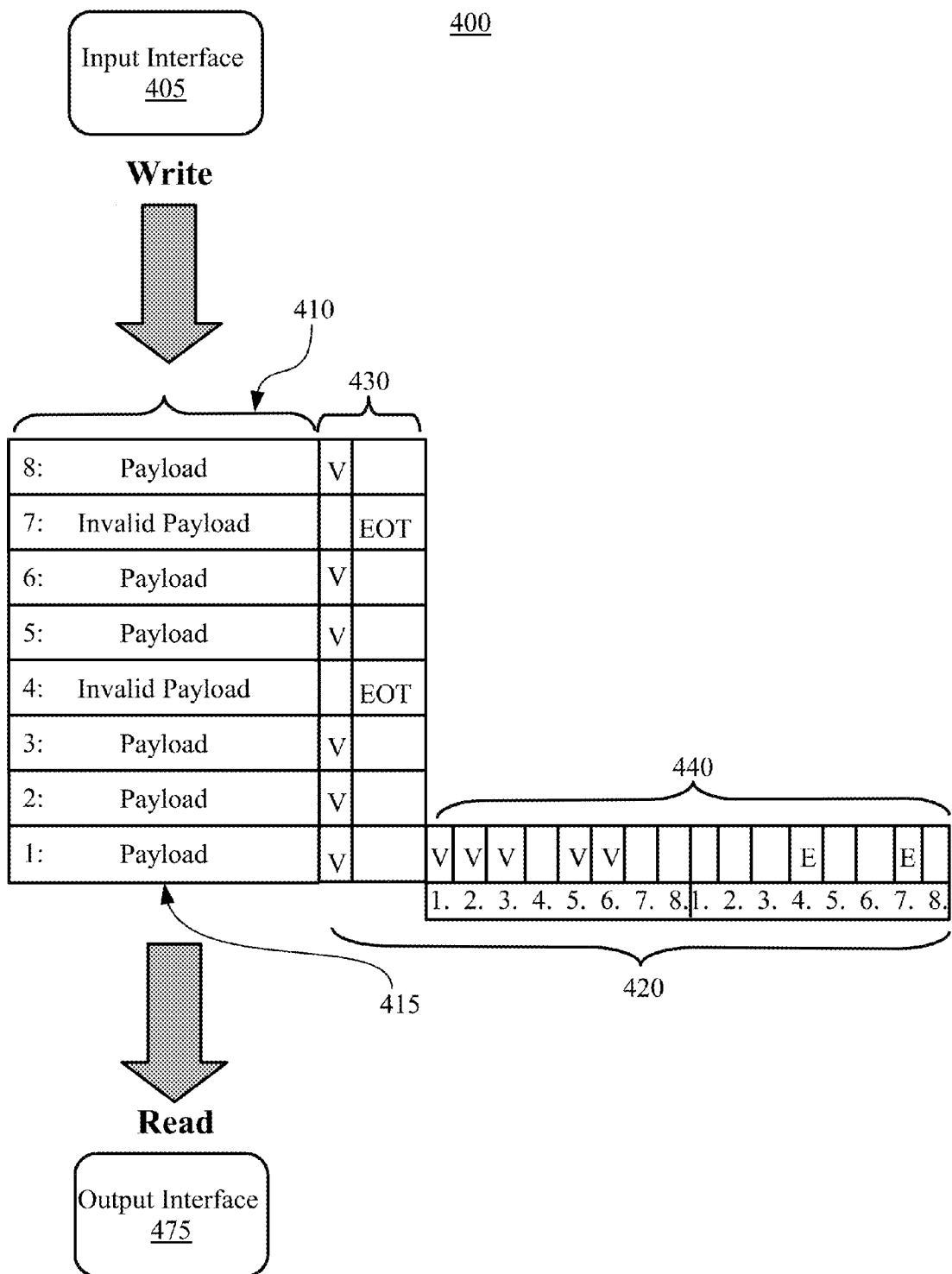
FIG. 4 depicts a first-in-first-out buffer system for status indication of a set of buffer entry elements, according to embodiments.

FIG. 4 depicts a FIFO buffer system 400 for status indication of a set of buffer entry elements, according to embodiments. Aspects of FIG. 4 relate to using a set of status indicators to facilitate asynchronous data communication between a sending unit and a receiving unit in a direct memory access (DMA) environment. As shown in FIG. 4, the FIFO buffer system 400 may include an input interface 405, a set of buffer entry elements 410, a set of data payloads 415, a set of status indicators 420, a set of status fields 430, a status register 440, and an output interface 475. The set of status indicators 300 may be associated with benefits including data transfer speed, memory bus performance and efficiency. Leveraging status indication for the set of buffer entry elements 410 of the FIFO buffer system 400 may facilitate data communication between computer components.

In embodiments, the FIFO buffer system 400 may include an input interface 405. The input interface 405 may be configured to receive a set of data payloads 415. Generally, the input interface 405 can include a connection, link, or channel for facilitating communication between a sending unit (e.g., memory bus) and the FIFO buffer system 400. In embodiments, the input interface 405 may be configured to receive a set of write operations (e.g., from the sending unit)

to accept input of the set of data payloads (e.g., data elements). The set of data payloads may include units of information for transfer from a sending unit to a receiving unit via the FIFO buffer system 400. In embodiments, one or more data payloads may constitute a packet (e.g., bundle or package of related data). The set of data payloads may include both valid and invalid data payloads. As shown in FIG. 4, the set of data payloads may include six valid payloads and two invalid payloads. In certain embodiments, each of the set of data payloads may have a single size value for a valid payload. The size value may include a storage space requirement, necessary memory value, or other designated resource value. As an example, the size value for a data payload may be 32 megabytes. Other types of data payloads are also possible.

In embodiments, the set of data payloads 415 may be stored in a set of buffer entry elements 410. Generally, the set of buffer entry elements 410 may include one or more storage slots, spaces, receptacles, or areas configured for reception and storage of the set of data payloads. In embodiments, each of the set of buffer entry elements may have a single size value for a valid payload. The size value may include a storage size capacity, specified number of bits, or designated amount of memory allocated for storage of a data payload. For example, the size value may include a storage size capacity of 64 megabytes. In embodiments, the set of buffer entry elements may include a number of queue positions, such that data payloads are received by the input interface 405, written into queue positions of the set of buffer entry elements (e.g., rotating positions as new elements enter) and exit (e.g., are dequeued) the FIFO buffer system 400 in the same order in which they were received. For instance, as shown in FIG. 4, the set of buffer entry elements 410 may include 8 buffer entry elements (e.g., numbered 1 through 8) to store the set of data payloads 415 such that each individual data payload occupies a single buffer entry element of the set of buffer entry elements 410. In embodiments, data payloads may enter into the set of buffer entry elements 410 in position 8, and rotate to lower positions as new data payloads enter, with the data payload in position 1 exiting the set of buffer entry elements 410 (e.g., to be transferred to a receiving unit). Other methods of configuring the set of buffer entry elements 410 are also possible.

In embodiments, the FIFO buffer system 400 may include a set of status indicators 420. The set of status indicators 420 may be configured to indicate a set of statuses of the set of buffer entry elements 410 with respect to the set of data payloads 415. Generally, the set of status indicators 420 may include a data structure configured to indicate the current status (e.g., state, condition) of the set of data payloads 415 maintained in the set of buffer entry elements 410 of the FIFO buffer system 400. In embodiments, the set of buffer entry elements 410 may be coupled with the set of status indicators 420. For example, the set of status indicators 420 may be attached or communicatively connected with the set of buffer entry elements 410. In embodiments, the set of status indicators 420 may include a set of entries that map (e.g., correspond) to the set of buffer entry elements 410 to indicate the validity status of the set of data payloads 415. Other methods of configuring the set of status indicators 420 are also possible.

In embodiments, the set of status indicators 420 may indicate a sequence of the set of data payloads. The sequence may include an order, series, arrangement, composition, or progression of the validity status of the set of payloads. As an example, as shown in FIG. 4, beginning from queue position 1 of the set of buffer entry elements, the set of data payloads may form a validity status sequence of valid, valid, valid, invalid (e.g., End of Transmission), valid, valid, invalid, valid. In embodiments, the set of status indicators 420 may indicate a size of the set of data payloads. The size of the set of data payloads may indicate the number of data payloads arranged for consecutive transmission (e.g., particular packet, subset, or group of data payloads separated by an End of Transmission notification). For example, as shown in FIG. 4, the subset of data packets occupying queue positions 1, 2, and 3 of the set of entry buffer elements 410 may have a size of 3 units (e.g., 3 payloads before an End of Transmission). In embodiments, a receiver (e.g., memory bus) of the set of data payloads 415 may make use of the sequence and size of the set of data payloads to anticipate incoming data transmissions (e.g., and avoid interrupts).

In embodiments, the set of status indicators 420 may include a set of status fields 430 which indicates the set of statuses of the set of buffer entry elements 410 with respect to the set of data payloads 415. The set of status fields 430 may include a portion of a database (e.g., column) that maintains a representation of the validity status of the set of data payloads 415 of the set of buffer entry elements 410. As shown in FIG. 4, the set of status fields 430 may include an extension of the FIFO buffer system interface that displays the validity status of each corresponding data payload stored in the set of buffer entry elements 410. In embodiments, the set of status fields 430 may dynamically update as data payloads rotate in and out of the FIFO buffer system 400. Other methods of configuring the set of status fields 430 are also possible.

In embodiments, the set of status indicators may include a status register 440 which indicates the set of statuses of the set of buffer entry elements 410. Generally, the status register 440 may include a log, index, database, or set of records for storing a representation of the status of one or more data elements of the FIFO buffer system. For instance, the status register 440 may maintain a set of entries corresponding to the set of data elements of the FIFO buffer system 400 (e.g., one bit per buffer entry element of the FIFO buffer system), and mark one or more entries of the set of entries with an indicator of the validity status of the corresponding FIFO data element. In embodiments, the status register 440 may be configured to monitor the set of status fields 430, and update the validity status of the set of data payloads 415 in the status register 440 based on the set of status fields 430. Other methods of configuring the status register 440 are also possible Aspects of the disclosure, in embodiments, relate to a configuration in which the status register 440 is accessible to a receiver of the set of data payloads 415 (e.g., processing unit, memory bus). Accordingly, the receiver of the set of data payloads 415 may obtain a preview of the number, validity status, packet separation, and other information related to the set of data payloads 415. As an example, in certain embodiments, when a receiving unit performs a read operation of the FIFO buffer system 400 (e.g., to receive transmission of a data payload in dequeuing position 8 of the set of buffer entry elements 410), it may also be configured to read the status register 440 to acquire information indicating that the data payloads in positions 1, 2, 3, 5, 6, and 8 are valid, and that the data payloads in positions 4 and 7 indicate an End of Transmission. Other methods of configuring the status register 440 are also possible.

As described herein, the set of statuses 420 may include one or more validity statuses for the set of payloads 415. In embodiments, the set of statuses 420 may include a valid payload status. The valid payload status may apply to data payloads that are ready for transmission, interpretable (e.g., formatted to be readable by the processing units of the host computer system; non-encrypted), and available for reception by a receiving unit. In embodiments, the set of statuses 420 may include an invalid state. The invalid state may apply to data payloads that are non-interpretable (e.g., formatted in a language or encryption format unreadable by processing units of the host computer system), corrupted, or not available for reception by the receiving unit. In embodiments, the set of statuses may include a boundary status. The boundary status may indicate the start-point, end-point, or other limit of a data transmission. In certain embodiments, the boundary status may indicate an End of Termination status that indicates the limit of a data transfer. Generally, the End of Termination status may indicate the conclusion of a transmission of one or more data payloads. In certain embodiments, the End of Termination status may serve to separate a first subset of data payloads from a second subset of data payloads of the FIFO buffer system 400. As an example, as shown in FIG. 4, the data payloads stored in queue positions 1, 2, and 3 of the set of entry buffer elements may constitute a first data packet (e.g., bundle of related data), and the End of Termination status may separate the first data packet from subsequent data packets (e.g., the data packet including data payloads in queue positions 5 and 6). Other types of validity status are also possible.

In embodiments, the FIFO buffer system 400 may include an output interface 475. The output interface 475 may be configured to release (e.g., discharge, let go, deliver, transmit) the set of data payloads 415. Generally, the output interface 475 can include a connection, link, or channel for facilitating communication between the FIFO buffer system 400 and a receiver (e.g., memory bus). In embodiments, the output interface 475 may be configured to enable a set of read operations (e.g., of a receiving unit) to acquire one or more of the set of data payloads 415 as well as the set of statuses 420 for the set of data payloads 415 of the set of buffer entry elements 410. As described herein, providing status information for the set of data payloads 415 may allow the receiving unit to anticipate the number, size, type, and validity of incoming data payloads, leading to benefits including data transmission speed, performance and efficiency.

Consider an example scenario in which the FIFO buffer system 400 is used to facilitate data transmission of a set of data payloads 410 corresponding to fitness activities of a user. The user may record fitness activities (e.g., walk, bike ride, swim, weight lifting) in a fitness log on one or more personal mobile devices (e.g., computers, smart phones, tablets), and a set of data payloads 415 corresponding to the fitness activities may be transmitted from the personal mobile device(s) of the user to a central management unit via the FIFO buffer system 400. For instance, the user may submit fitness activities including a weightlifting session, treadmill running, and a game of tennis. In embodiments, the weightlifting session may correspond to three data payloads (e.g., 3 sets of lifting within a time threshold), the treadmill running may correspond to two data payloads (e.g., first portion run at a first speed, second portion run at a second speed), and the game of tennis may correspond to one payload (e.g., one round was played). The data payloads for the different fitness activities may be separated by invalid payloads (e.g., to distinguish between the different fitness activities). The input interface 405 may be configured to receive input of the set of data payloads 415, and store them in the set of buffer entry elements 410. In embodiments, the set of data payloads 415 may be associated with a set of statuses 420. The set of status fields 430 may indicate the validity status of each data payload of the set of data payloads 415. As shown in FIG. 4, the set of status fields 430 may indicate a valid status (e.g., indicating a fitness activity) for the first three payloads (e.g., weightlifting), the fifth and sixth payloads (e.g., treadmill running), and the eighth payload (e.g., game of tennis), and an End of Transmission status for the fourth and seventh invalid payloads (e.g., to mark separation of the fitness activities). The status register 440 may query the set of status fields 430, and provide the validity status information for the set of data payloads 415 in the status register 440. In embodiments, the central management unit may be configured to perform a read operation to access the data payload stored in the dequeuing position (e.g., position 1) of the FIFO buffer system 400. As described herein, the central management unit may be configured to access the status register 440 to obtain validity status information for the set of data payloads 415. Accordingly, the central management unit may use the validity status information to anticipate the number, size, type, and validity of incoming data payloads (e.g., generate notifications for the user based on incoming data payload status information). Other use configurations for the FIFO buffer system 400 are also possible.

Figure 5:
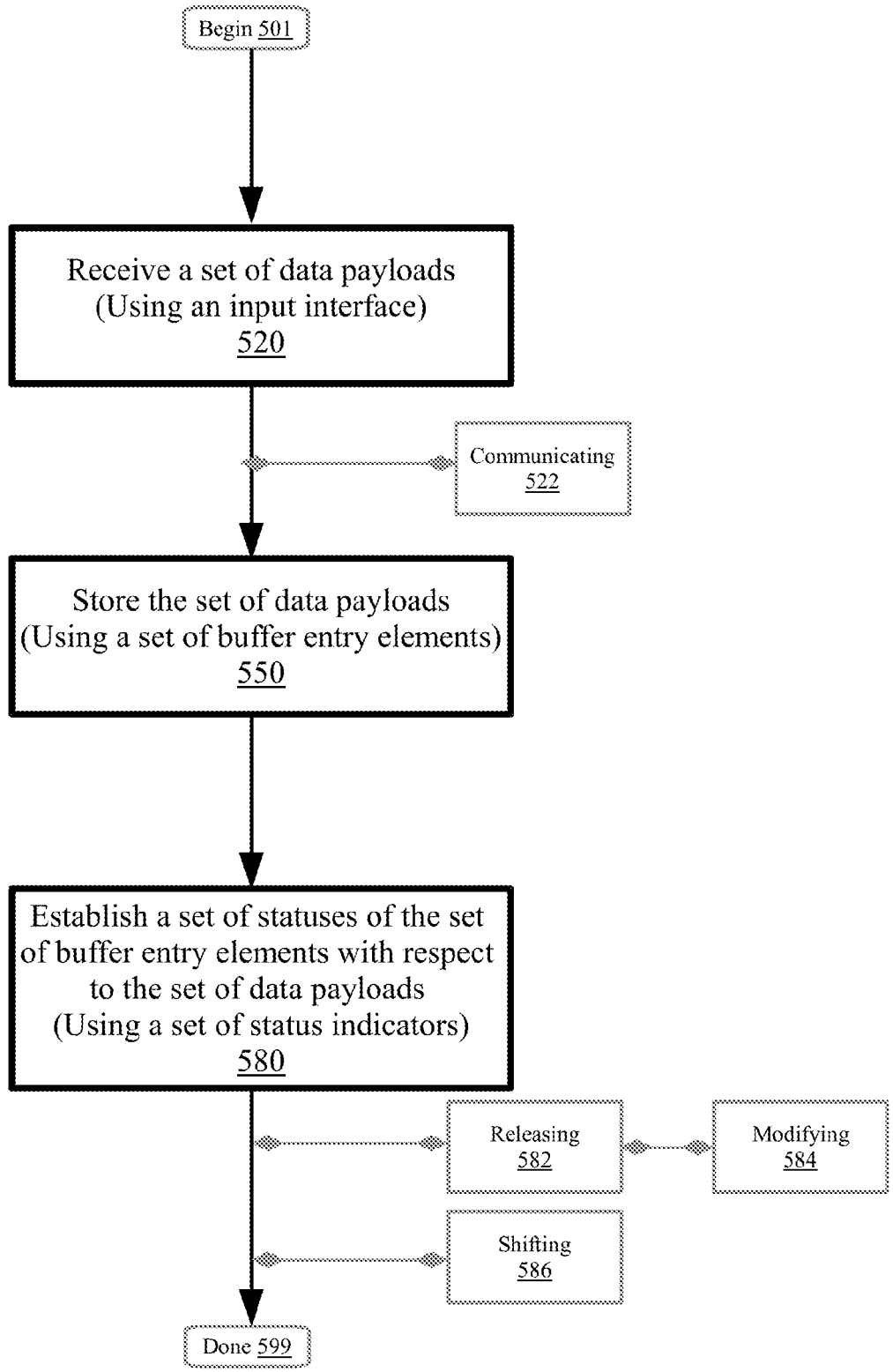
FIG. 5 is a flowchart illustrating a method for a first-in-first-out buffer system, according to embodiments.

FIG. 5 is a flowchart illustrating a method 500 for a first-in-first-out (FIFO) buffer system, according to embodiments. Aspects of FIG. 5 relate to establishing a set of statuses for a set of data payloads stored in a set of buffer entry elements of a FIFO buffer system. The method 500 include a receiving block 520, a storing block 550, an establishing block 580, and a number of other blocks for implementing aspects of the disclosure. The method 500 may begin at block 501. Leveraging status information for data payloads of a FIFO buffer system may facilitate data communication between computer components.

At block 520, a set of data payloads may be received using an input interface. Generally, receiving can include collecting, retrieving, detecting, or accepting delivery of the set of data payloads. The input interface can include a connection, link, or channel for facilitating communication between a sending unit (e.g., memory bus) and the FIFO buffer system. In embodiments, the input interface may be configured to receive a set of write operations (e.g., from the sending unit) to accept input of the set of data payloads (e.g., data elements). As described herein, the set of data payloads may include units of information for transfer from a sending unit to a receiving unit via the FIFO buffer system. In embodiments, one or more data payloads may constitute a packet (e.g., bundle or package of related data). The set of data payloads may include both valid and invalid data payloads. In embodiments, receiving the set of data payloads may include verifying the transfer of the set of data payloads, and writing the set of data payloads to a set of buffer entry elements for storage in the FIFO buffer system. As an example, consider that a FIFO buffer system detects a scheduled write operation to the set of buffer entry elements. Accordingly, the FIFO buffer system may verify the nature of the incoming set of data payloads (e.g., required storage capacity, time duration that the payloads will remain in the FIFO buffer system), and approve the write operation to permit storage of the set of data payloads in the set of buffer entry elements. Other methods of receiving the set of data payloads using the input interface are also possible.

In embodiments, a plurality of data payloads of the set of data payloads may be communicated without an interrupt at block 522. Generally, communicating can include transmitting, sending, transferring, reading/writing, or otherwise conveying the plurality of data payloads without an interrupt. Aspects of the disclosure relate to the recognition that, in certain embodiments, updating the FIFO buffer system (e.g., when data payloads enter or exit the FIFO buffer) triggers an interrupt handler. For instance, in transactions with multiple data payloads (e.g., packets), each update may cause invocation of the interrupt handler, leading to decreased system performance. Accordingly, aspects of the disclosure relate to computing (e.g., deriving) the number of packets from the header number (e.g., set of statuses) and disabling the interrupt handler provided all data payloads are received. In response to registering the status of the payloads in the set of statuses, a receiving unit may be configured to read status information regarding the set of payloads from the FIFO (e.g., avoiding empty accesses to FIFO and without use of the interrupt handler). Upon completion of the transaction, the interrupt handler may be revoked in order to perform the next transaction. Other methods of communicating the plurality of data payloads without using an interrupt are also possible.

At block 550, the set of data payloads may be stored using a set of buffer entry elements. Generally, storing can include saving, collecting, writing, or maintaining the set of data payloads. In embodiments, the set of data payloads may be stored using the set of buffer entry elements. The set of buffer entry elements may include one or more storage slots, spaces, or areas configured for reception and storage of the set of data payloads. In embodiments, each buffer entry element of the set of buffer entry elements may represent one queue position for maintaining a data payload. The set of buffer entry elements may include a number of queue positions, such that data payloads enter the FIFO buffer system, are maintained in the set of buffer entry elements (e.g., rotating positions as new data elements enter), and exit the FIFO buffer system in the same order in which they were received. In embodiments, storing the set of data payloads may include writing each incoming data payload of the set of data payloads to a separate buffer entry element of the set of buffer entry elements. For instance, in response to receiving 4 incoming data payloads, 4 data payloads currently stored in the front of the FIFO queue may be released (e.g., transmitted to a receiving unit), 4 data payloads stored in the back of the FIFO queue may be rotated 4 queue positions to the front, and the new 4 data payloads may be stored in the 4 vacated buffer entry elements at the back of the FIFO queue. Other methods of storing the set of data payloads are also possible.

At block 580, a set of statuses of the set of buffer entry elements may be established with respect to the set of data payloads. The set of statuses of the set of buffer entry elements may be established using the set of status indicators. Generally, establishing can include instantiating, assigning, providing, or indicating the set of statuses of the set of buffer entry elements. The set of statuses may include information regarding the availability, validity, or usability of the set of data payloads stored in the set of buffer entry elements. In embodiments, the set of statuses may be represented using the set of status indicators. The set of status indicators may include markers, flags, tags, or other identifiers that represent the set of statuses for the set of data payloads. As described herein, the set of statuses may include a valid payload status, an invalid payload status, and an End of Transmission status. The valid payload status may apply to data payloads that are ready for transmission, interpretable (e.g., formatted to be readable by the processing units of the host computer system; non-encrypted), and available for reception by a receiving unit. The invalid payload status may apply to data payloads that are non-interpretable (e.g., formatted in a language or encryption format unreadable by processing units of the host computer system), corrupted, or not available for reception by the receiving unit. Other possibilities/combinations are considered in various embodiments. For example, the valid payload status can represent encrypted data for further processing (and the invalid payload status may represent control information). The End of Termination status may indicate the conclusion of a transmission of one or more data payloads. In certain embodiments, the End of Termination status may serve to separate a first subset of data payloads from a second subset of data payloads of the FIFO buffer system. In embodiments, establishing the set of statuses may include configuring the status indicators of the set of buffer entry elements to represent the current state of the set of data payloads. Other methods of establishing the set of statuses are also possible.

In embodiments, the set of data payloads may be released using an output interface at block 582. Generally, releasing may include transmitting, discharging, sending, or dequeuing the set of data payloads. As described herein, aspects of the disclosure relate to storing the set of data payloads in a set of buffer entry elements of a FIFO buffer system. Accordingly, as additional data payloads enter the FIFO buffer system, older payloads may rotate out of the queue and be transmitted to a receiving unit (e.g., processor, memory bus). As an example, releasing the set of data payloads may include using an output interface configured to enable a set of read operations (e.g., of the receiving unit) to provide one or more of the set of data payloads to the receiving unit. In response to the set of data payloads being read by the receiving unit, the output interface may be configured to clear the corresponding entry buffer elements, and advance the queue position of other queued data payloads. Other methods of releasing the set of data payloads are also possible.

In embodiments, the set of statuses of the set of buffer entry elements may be modified with respect to the set of data payloads at block 584. The set of statuses may be modified using the set of status indicators. Generally, modifying can include editing, revising, adjusting, or otherwise changing the set of statuses. In embodiments, modifying may include altering the status of one or more data payloads from one validity status to another. Modifying may include monitoring the set of data payloads, and dynamically updating the validity status of a payload in response to detecting a change with respect to one or more payloads. As an example, in response to detecting that a particular data payload has a portion of data encrypted using an unknown encryption format, the status indicator corresponding to the particular data payload may be modified from "valid" to "invalid." Other methods of modifying the set of buffer entry elements using the set of status indicators are also possible.

In embodiments, a set of register values of the status register may be shifted at block 586. The set of register values of the status register may be shifted by a single position in response to a release of a single data payload. Generally, shifting can include moving, switching, incrementing, iterating, or advancing the set of register values. As described herein, in certain embodiments, the set of status indicators may include a status register which indicates the set of statuses of the set of buffer entry elements with respect to the set of data payloads. The status register may include a log, index, database, or set of records for storing a representation of the status of one or more data elements of the FIFO buffer system. Aspects of the disclosure relate to the recognition that, as data payloads enter and exit the FIFO buffer system, the content and validity status of the set of buffer entry elements may change. Accordingly, the status register may be configured to shift the set of statuses for the set of data payloads as the contents of the FIFO buffer system change (e.g., to match the updated contents of the FIFO buffer). For example, when a single data payload exits the FIFO buffer system, the status register may update the set of statuses by advancing each register value by one position, and creating a new register value at the end of the status register for the newly entered data payload. Other methods of shifting the set of register values in response to the release of a single data payload are also possible.

Method 500 concludes at block 599. Aspects of method 500 may provide performance or efficiency benefits for management of a first-in-first-out (FIFO) buffer system. For example, aspects of method 500 may have positive impacts with respect to using a set of status indicators to indicate the validity status of a set of data payloads stored in a FIFO buffer system. The receiving, the storing, the establishing and other steps described herein may each occur in an automated fashion without user invention. Altogether, leveraging status information for data payloads of a FIFO buffer system may facilitate data communication between computer components.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for use by a sender computer device that includes a first in first out buffer (FIFO) memory and a status register, the method comprising:
    receiving, by the sender computer device, a communication data set to be communicated over a communication network to a recipient computer device;
    creating, by the sender computer device, a plurality of sequential packets collectively including data of the communication data set, with each sequential packet including a substantially equal amount of data from the communication data set;
    for each given sequential packet of the plurality of sequential packets:
        determining status information for the given sequential packet, where the status information for each given sequential packet indicates of one of the following three status types: valid, invalid or end of sequence,
        storing, by the sender computer device, the given sequential packet in the FIFO memory while moving previously stored sequential packets through the FIFO memory in a first in first out manner, and
        storing the status information for the given sequential packet in an associated entry of the status register while shifting register values of the status register to account for storage of the status information for the given sequential packet;
    communicating, to a receiver computer device, the status register, with the communication of the status register including information indicative of: (i) the receiver computer should not read at least one sequential packet in the FIFO memory having a status information in the status register indicative of an invalid status, and (ii) an interrupt handler should be disabled for processing receiving the contents of the FIFO memory; and
    responsive to communicating the status register, communicating contents of the FIFO memory to the receiver computer device, based, at least in part on the status information for each sequential packet in the status register;
    wherein a complete instance of the status register is embedded within unused bus bandwidth and communicated simultaneously with each stored packet of the FIFO memory.

2. The method of claim 1, wherein the valid status type includes information indicative of the given sequential packet is at least one of the following: (i) interpretable, (ii) ready for transmission, (iii) formatted to be readable by the processing units of a host computer system, (iv) non-encrypted, and/or (v) available for reception by a receiving unit.

3. The method of claim 1, wherein the invalid status type includes information indicative of the given sequential packet is at least one of the following: (i) non-interpretable, (ii) not ready for transmission, (iii) formatted in a language or encryption format unreadable by processing units of a host computer system, (iv) corrupted, and/or (v) not available for reception by the receiving unit.

4. The method of claim 1, wherein the end of sequence status type includes information indicative of the given sequential packet will be followed by a separation, pause, or break in the transmission of data elements from the FIFO buffer system.

5. The method of claim 1, wherein:
    the status register includes two status registers, a first status register and a second status register, for each sequential packet of the plurality of sequential packets;
    the first status register includes a binary bit indicative of whether the given sequential packet has a valid or invalid status; and
    the second status register including a binary bit indicative of the given sequential packet having an end of transmission or not an end of transmission status.

6. A computer program product (CPP) comprising:
    a first in first out buffer (FIFO) memory;
    a status register;
    a machine readable storage device; and
    computer code stored on the machine readable storage device, with the computer code including instructions for causing a processor(s) set to perform operations including the following:
        receiving, by a sender computer device, a communication data set to be communicated over a communication network to a recipient computer device,
        creating, by the sender computer device, a plurality of sequential packets collectively including data of the communication data set, with each sequential packet including a substantially equal amount of data from the communication data set,
        for each given sequential packet of the plurality of sequential packets:
            determining status information for the given sequential packet, where the status information for each given sequential packet indicates of one of the following three status types: valid, invalid or end of sequence,
            storing, by the sender computer device, the given sequential packet in the FIFO memory while moving previously stored sequential packets through the FIFO memory in a first in first out manner, and
            storing the status information for the given sequential packet in an associated entry of the status register while shifting register values of the status register to account for storage of the status information for the given sequential packet,
        communicating, to a receiver computer device, the status register, with the communication of the status register including information indicative of: (i) the receiver computer should not read at least one sequential packet in the FIFO memory having a status information in the status register indicative of an invalid status, and (ii) an interrupt handler should be disabled for processing receiving the contents of the FIFO memory, and
        responsive to communicating the status register, communicating contents of the FIFO memory to the receiver computer device, based, at least in part on the status information for each sequential packet in the status register;
    wherein a complete instance of the status register is embedded within unused bus bandwidth and communicated simultaneously with each stored packet of the FIFO memory.

7. The CPP of claim 6, wherein the valid status type includes information indicative of the given sequential packet is at least one of the following: (i) interpretable, (ii) ready for transmission, (iii) formatted to be readable by the processing units of a host computer system, (iv) non-encrypted, and/or (v) available for reception by a receiving unit.

8. The CPP of claim 6, wherein the invalid status type includes information indicative of the given sequential packet is at least one of the following: (i) non-interpretable, (ii) not ready for transmission, (iii) formatted in a language or encryption format unreadable by processing units of a host computer system, (iv) corrupted, and/or (v) not available for reception by the receiving unit.

9. The CPP of claim 6, wherein the end of sequence status type includes information indicative of the given sequential packet will be followed by a separation, pause, or break in the transmission of data elements from the FIFO buffer system.

10. The CPP of claim 6, wherein:
the status register includes two status registers, a first status register and a second status register, for each sequential packet of the plurality of sequential packets;
the first status register includes a binary bit indicative of whether the given sequential packet has a valid or invalid status; and
the second status register including a binary bit indicative of the given sequential packet having an end of transmission or not an end of transmission status.

11. A computer system (CS) comprising:
a first in first out buffer (FIFO) memory;
a status register;
a processor(s) set;
a machine readable storage device; and
computer code stored on the machine readable storage device, with the computer code including instructions for causing the processor(s) set to perform operations including the following:
receiving, by a sender computer device, a communication data set to be communicated over a communication network to a recipient computer device,
creating, by the sender computer device, a plurality of sequential packets collectively including data of the communication data set, with each sequential packet including a substantially equal amount of data from the communication data set,
for each given sequential packet of the plurality of sequential packets:
determining status information for the given sequential packet, where the status information for each given sequential packet indicates of one of the following three status types: valid, invalid or end of sequence,
storing, by the sender computer device, the given sequential packet in the FIFO memory while moving previously stored sequential packets through the FIFO memory in a first in first out manner, and
storing the status information for the given sequential packet in an associated entry of the status register while shifting register values of the status register to account for storage of the status information for the given sequential packet,
communicating, to a receiver computer device, the status register, with the communication of the status register including information indicative of: (i) the receiver computer should not read at least one sequential packet in the FIFO memory having a status information in the status register indicative of an invalid status, and (ii) an interrupt handler should be disabled for processing receiving the contents of the FIFO memory, and
responsive to communicating the status register, communicating contents of the FIFO memory to the receiver computer device, based, at least in part on the status information for each sequential packet in the status register;
wherein a complete instance of the status register is embedded within unused bus bandwidth and communicated simultaneously with each stored packet of the FIFO memory.

12. The CS of claim 11, wherein the valid status type includes information indicative of the given sequential packet is at least one of the following: (i) interpretable, (ii) ready for transmission, (iii) formatted to be readable by the processing units of a host computer system, (iv) non-encrypted, and/or (v) available for reception by a receiving unit.

13. The CS of claim 11, wherein the invalid status type includes information indicative of the given sequential packet is at least one of the following: (i) non-interpretable, (ii) not ready for transmission, (iii) formatted in a language or encryption format unreadable by processing units of a host computer system, (iv) corrupted, and/or (v) not available for reception by the receiving unit.

14. The CS of claim 11, wherein the end of sequence status type includes information indicative of the given sequential packet will be followed by a separation, pause, or break in the transmission of data elements from the FIFO buffer system.

15. The CS of claim 11, wherein:
the status register includes two status registers, a first status register and a second status register, for each sequential packet of the plurality of sequential packets;
the first status register includes a binary bit indicative of whether the given sequential packet has a valid or invalid status; and
the second status register including a binary bit indicative of the given sequential packet having an end of transmission or not an end of transmission status.

* * * * *